United States Patent
Esún et al.

(10) Patent No.: US 10,609,105 B2
(45) Date of Patent: Mar. 31, 2020

(54) SYSTEM AND METHOD FOR STREAMING MUSIC ON MOBILE DEVICES

(71) Applicant: SPOTIFY AB, Stockholm (SE)

(72) Inventors: Miguel Jiménez Esún, Stockholm (SE); Rafael Oleza Alomar, Stockholm (SE)

(73) Assignee: SPOTIFY AB, Stockholm (SE)

( * ) Notice: Subject to any disclaimer, the term of this patent is extended or adjusted under 35 U.S.C. 154(b) by 153 days.

(21) Appl. No.: 15/011,241

(22) Filed: Jan. 29, 2016

(65) Prior Publication Data

US 2016/0226941 A1    Aug. 4, 2016

Related U.S. Application Data

(60) Provisional application No. 62/109,553, filed on Jan. 29, 2015.

(51) Int. Cl.
    *H04L 29/06* (2006.01)

(52) U.S. Cl.
    CPC ...... *H04L 65/4092* (2013.01); *H04L 65/4084* (2013.01); *H04L 65/602* (2013.01); *H04L 65/607* (2013.01)

(58) Field of Classification Search
    CPC .................................................. H04L 65/4092
    See application file for complete search history.

(56) References Cited

U.S. PATENT DOCUMENTS

| | | | | |
|---|---|---|---|---|
| 2009/0299505 A1* | 12/2009 | Honza | .................. | G11B 27/322 700/94 |
| 2011/0238747 A1* | 9/2011 | Yu | ...................... | G06Q 30/0242 709/203 |
| 2013/0007223 A1* | 1/2013 | Luby | ................ | H04N 21/23106 709/219 |
| 2014/0136726 A1* | 5/2014 | Van Wie | ................. | H04L 12/00 709/231 |

* cited by examiner

*Primary Examiner* — Nicholas P Celani
(74) *Attorney, Agent, or Firm* — Tucker Ellis LLP

(57) ABSTRACT

In accordance with an embodiment, described herein is a system and method for streaming music on mobile devices, including those which may have limited support for streaming. In response to receiving a request for portions of media content to be retrieved from a media server and played at a media device, selected parts of a media content file (e.g., an MP3 file) can be downloaded from a media server, and prepended, appended, or otherwise adjusted into a complete (albeit relatively shorter) media content, which is decoded and sent, for example to an audio speaker at the media device. The approach provides flexibility in providing access to a media streaming service from non-native mobile device applications, for example by enabling a media application to load and play encrypted MP3 file content in environments such as mobile browsers that require low memory consumption, or do not support Media Source Extensions.

18 Claims, 6 Drawing Sheets

SYSTEM AND METHOD FOR STREAMING MUSIC ON MOBILE DEVICES

CLAIM OF PRIORITY

This application claims the benefit of priority to U.S. Provisional Patent Application No. 62/109,553, titled "SYSTEM AND METHOD FOR STREAMING MUSIC ON MOBILE DEVICES", filed Jan. 29, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to streaming media content, for example music content, and are particularly related to a system and method for streaming music on mobile devices, including those which may have limited support for streaming.

BACKGROUND

Today's consumers enjoy the ability to access a tremendous amount of media content, such as music and videos, at any location or time of day, using a wide variety of media devices.

Native media applications, for example Spotify clients adapted for use with a Spotify media content environment, are generally quite capable when streaming different types of media content. However, other types of media applications that rely on web technologies such as JavaScript/HTML5, or do not support Media Source Extensions, face some limitations.

For example, the audio API in JavaScript/HTML5 currently only allows complete MP3 files to be decoded into raw data, prior to being sent to an audio speaker, which in turn requires a client to download an entire, e.g., song, before any part of that song can be played. Additionally, some clients may be unable to play encrypted media content files (e.g., encrypted MP3 files), which prevents those clients from being used with media streaming services that store and stream their media content in an encrypted form.

These are some examples of the types of environments in which embodiments of the present invention may be used.

SUMMARY

In accordance with an embodiment, described herein is a system and method for streaming music on mobile devices, including those which may have limited support for streaming. In response to receiving a request for portions of media content to be retrieved from a media server and played at a media device, selected parts of a media content file (e.g., an MP3 file) can be downloaded from a media server, and prepended, appended, or otherwise adjusted into a complete (albeit relatively shorter) media content, which is decoded and sent, for example to an audio speaker at the media device. The approach provides flexibility in providing access to a media streaming service from non-native mobile device applications, for example by enabling a media application to load and play encrypted MP3 file content in environments such as mobile browsers that require low memory consumption, or do not support Media Source Extensions.

DETAILED DESCRIPTION

As described above, although native media applications are generally quite capable when streaming different types of media content; other types of media applications that rely on web technologies such as JavaScript/HTML5, or do not support Media Source Extensions, face some limitations, including, for example, requiring a client to download an entire, e.g., song, before any part of that song can be played.

In accordance with an embodiment, described herein is a system and method for streaming music on mobile devices, including those which may have limited support for streaming. In response to receiving a request for portions of media content to be retrieved from a media server and played at a media device, selected parts of a media content file (e.g., an MP3 file) can be downloaded from a media server, and prepended, appended, or otherwise adjusted into a complete (albeit relatively shorter) media content, which is decoded and sent, for example to an audio speaker at the media device.

The approach provides flexibility in providing access to a media streaming service from non-native mobile device applications, for example by enabling a media application to load and play encrypted MP3 file content in environments such as mobile browsers that require low memory consumption, or do not support Media Source Extensions.

In accordance with an embodiment, the system or method comprises receiving a request for portions of media content to be retrieved from a media server, to be played at a media device; in response to the request for portions of media content to be retrieved from a media server, communicating a request for chunks of media content to be decoded; in response to receiving the request for chunks of media content, transforming requested chunk indexes into byte positions, and communicating a request for a byte range of media content; and in response to receiving the request for a byte range of media content, communicating a request to the media server, for downloading the media content corresponding to the byte range requested, for use in providing the portions of media content to be played at the media device.

In accordance with an embodiment, each piece of media content is stored or provided in the form of an MP3 file, and wherein each chunk is a group of one or more frames of the MP3 file.

In accordance with an embodiment, the processing of the media content includes decoding one or more additional frames before and/or after a chunk to be decoded, and then dropping play of those additional frames by setting appropriate start and stop points.

The above and additional embodiments are described in further detail below.

Media Content Environment

Figure 1:
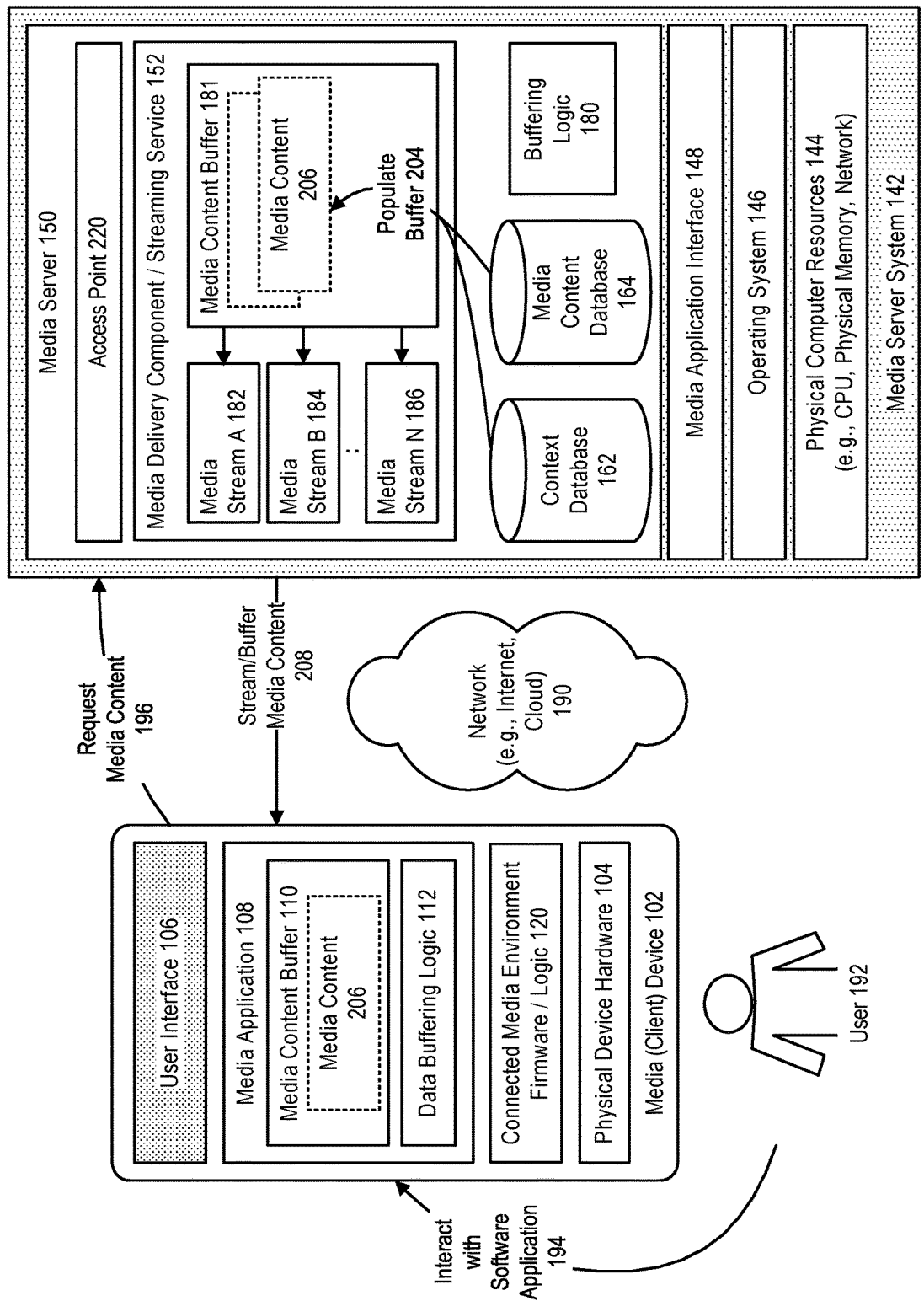
FIG. 1 illustrates an example of a system for providing media content, in accordance with an embodiment.

FIG. 1 illustrates an example of a system for providing media content, in accordance with an embodiment.

As illustrated in FIG. 1, in accordance with an embodiment, a media device 102, operating as a client device, can receive and play media content provided by a backend media server system 142 (media server), or by another system or peer device. In accordance with an embodiment, the client device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a user interface 106, which is adapted to display media options, for example as an array of media tiles, thumbnails, or other format, and to determine a user interaction or input. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a media application 108, together with an in-memory client-side media content buffer 110, and a data buffering logic 112, which can be used to control the playback of media content received from the media server, for playing either at a requesting client device (i.e., controlling device) or at a controlled client device (i.e., controlled device), in the manner of a remote control. A connected media environment firmware/logic 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment which supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling client device, and their audio speaker as a controlled client device to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination client device to which the media content is being streamed changes, from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client devices to search within repositories of media content, to locate particular media content items.

In accordance with an embodiment, a buffering logic 180 can be used to retrieve or otherwise access media content items, in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device, and issue requests to access media content, for example the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content, 206 including one or more streams of media content data, and can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a Spotify media content environment, most Spotify clients connect to various Spotify back-end processes via a Spotify "accesspoint", which forwards client requests to other servers, such as sending one or more metadataproxy requests to one of several metadataproxy machines on behalf of the client or end user.

Figure 2:
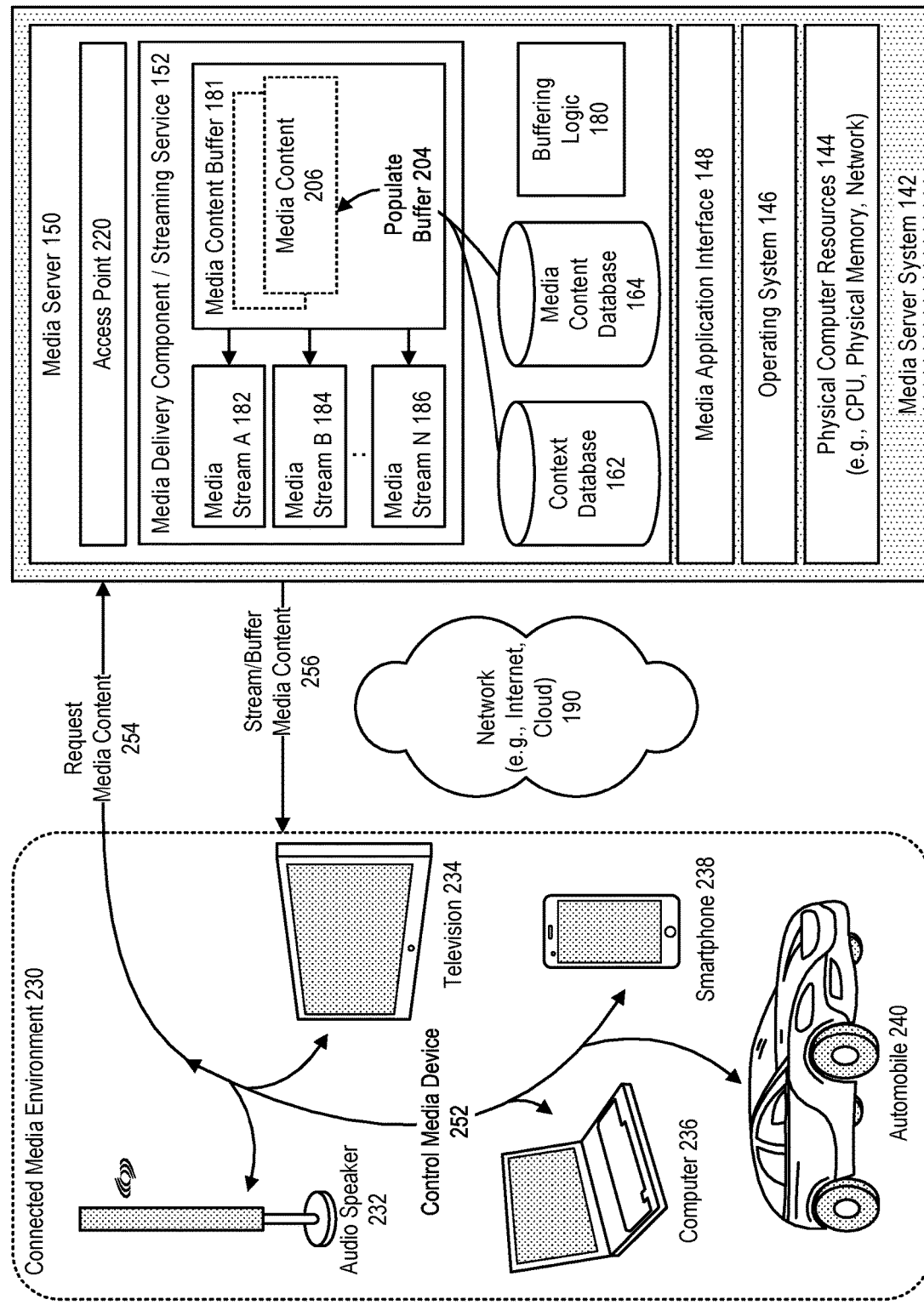
FIG. 2 further illustrates an example of a system for providing media content, in accordance with an embodiment.

FIG. 2 further illustrates an example of a system for providing media content, in accordance with an embodiment.

As illustrated in FIG. 2, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
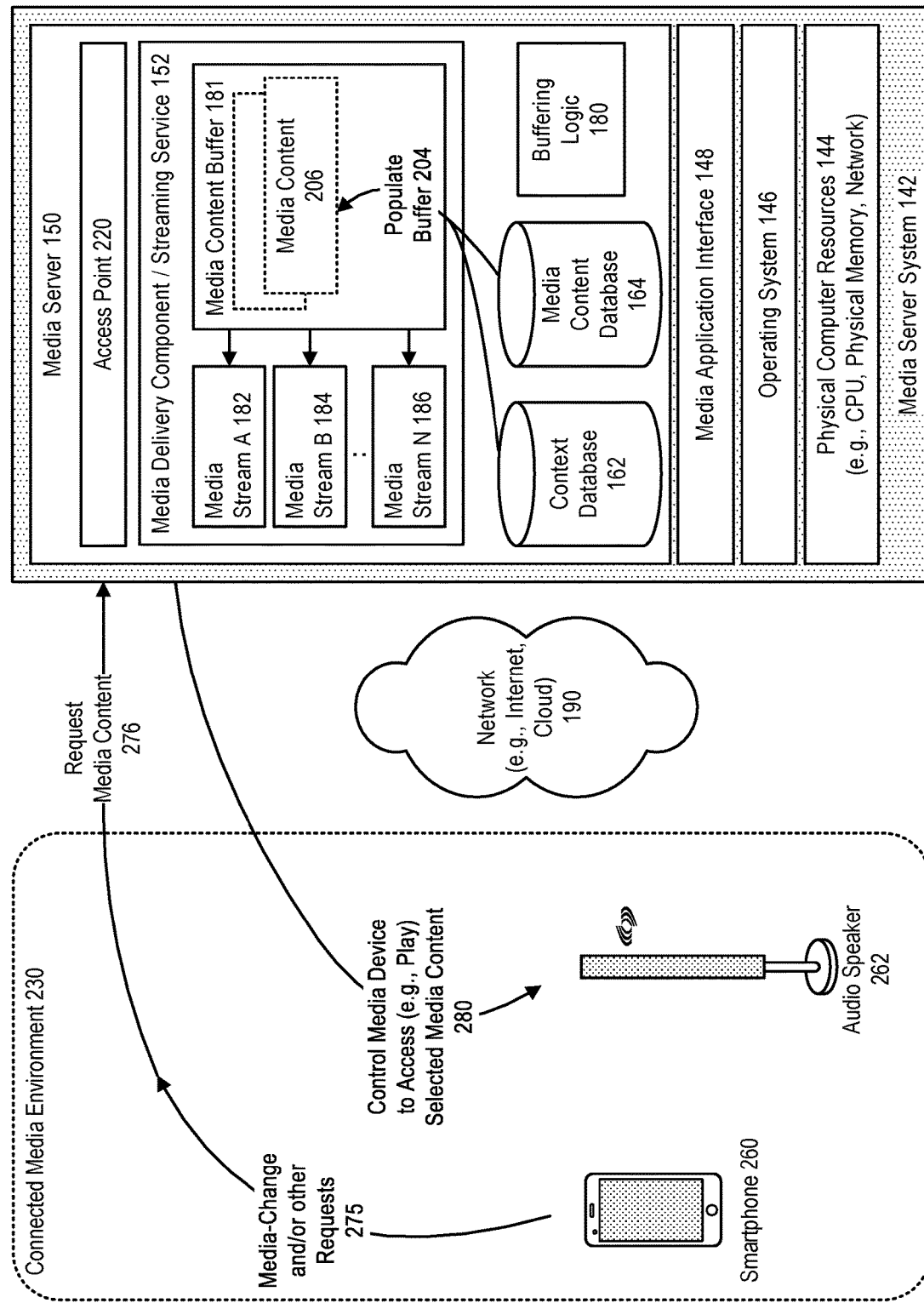
FIG. 3 further illustrates an example of a system for providing media content, in accordance with an embodiment.

FIG. 3 further illustrates an example of a system for providing media content, in accordance with an embodiment.

As illustrated in FIG. 3, a user can utilize, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

Media Content Streaming

As described above, although native media applications are generally quite capable when streaming different types of media content; other types of media applications may face some limitations, including, for example, requiring a client to download an entire, e.g., song, before any part of that song can be played.

To address this, in accordance with an embodiment, described herein is a system and method for streaming music on mobile devices, including those which may have limited support for streaming. In response to receiving a request for portions of media content to be retrieved from a media server and played at a media device, selected parts of a media content file (e.g., an MP3 file) can be downloaded from a media server, and prepended, appended, or otherwise adjusted into a complete (albeit relatively shorter) media content, which is decoded and sent, for example to an audio speaker at the media device.

Figure 4:
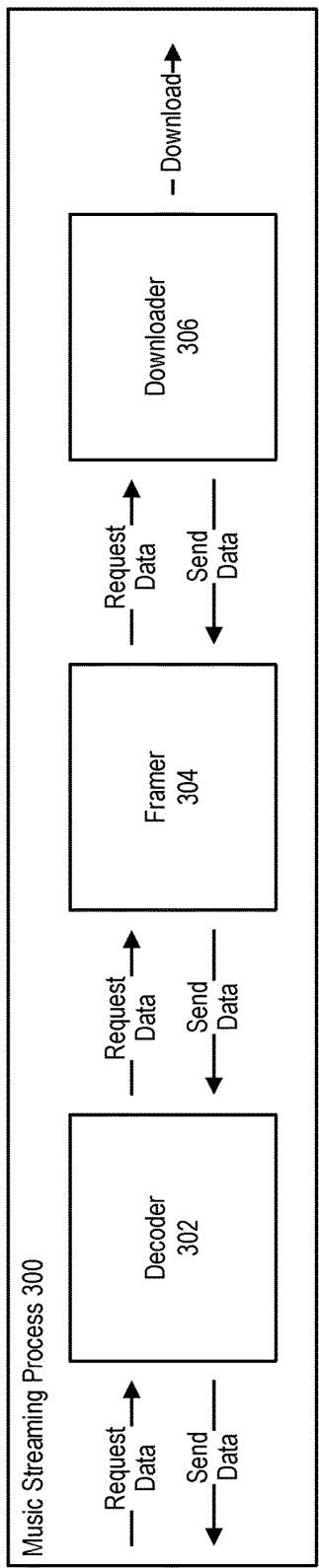
FIG. 4 illustrates a method for streaming music on mobile devices, in accordance with an embodiment.

FIG. 4 illustrates a method for streaming music on mobile devices, in accordance with an embodiment.

As illustrated in FIG. 4, in accordance with an embodiment, the method or process 300 can be implemented within a media application provided at a media device, as a pipe that includes several modules or logical code components that interact with each other to download, process, decode, and play a media content file (e.g., an MP3 file) in real time.

Since JavaScript works with events, in accordance with an embodiment, the pipe can be controlled by events, rather than by a main loop (which would also be inefficient).

In accordance with an embodiment, a decoder module 302 is responsible for pushing media content (e.g., a song, music, or other audio content), to a sound card or other output mechanism of the media device, and communicating requests to a framer module 304, requesting chunks to be decoded, wherein each chunk is a group of frames of media content (e.g., MP3 frames). Although the decoder can also decode individual frames, it is generally more efficient to decode a chunk of several frames at a time. For example, the decoder can request and receive a chunk of media content as "frames 100 through 110", and decode that media content into a raw audio data format that is playable by the sound card.

In accordance with an embodiment, the framer module is responsible for transforming chunk indexes into byte positions, and communicating requests to a downloader module 306, requesting a particular range of media content. The framer module can first determine if it has the data available within an internal buffer, prior to making a request for that data.

In accordance with an embodiment, the downloader module is responsible for communicating requests, e.g., to a media server, for downloading particular pieces of media content, or in some instances waiting until a current request has downloaded a sufficient amount of data to extract the particular range requested by the framer module. The downloader module can similarly first determine if it has the data available within an internal buffer, prior to making a request for that data.

In accordance with an embodiment, when the downloader module has the data required to respond to a received request, it will call back the framer module, which in turn will call back the decoder module. The process can be kept alive by the onended callback of a buffer source (e.g., BufferSource) object: as soon as a buffer has finished play, this callback can be called, which indicates that a new group of chunks can be pushed to the sound card.

For an initial play of a media content file, such as an MP3 file, a group of chunks can be pushed at the same time to a sound card (with different starting times); and as each particular chunk finishes, a new chunk can be pushed. This can be used to provide several seconds of buffered music, with minimal perceptible music cut.

In accordance with an embodiment, each of the decoder, framer, and downloader modules, or other logical code components, works within their own unit of measurement such that, for example, the downloader module handles bytes of data; the framer module handles media content frames (e.g., MP3 frames); and the decoder module handles seconds of media content. This enables each module to be in charge of transforming the units it manages, to or from the units of a previous/next module.

In accordance with an embodiment, the above-described pipe is able to request and decode data given a particular start time (for example, as a result of a user requesting playback of a particular song or music from a starting point beginning, say, 60 seconds into a song and continuing for a further 5 seconds, which timeframe corresponds to, say, "frames 100 through 110" of the corresponding media content); and to push raw audio data to the sound card or other output mechanism, the process of which is further described below.

File Downloading

In accordance with an embodiment, an MP3 file can be downloaded from a content delivery network, for example a media server, using an XHR (XMLHttpRequest) object. A Range header (that accepts a start and end byte) can be used to select which part of the file to download. To be able to play the media content as fast as possible, an onreadystatechange event of the XHR object can be used, which is triggered each time a new bit of the file is received with an appropriate readyState parameter. The system can queue all of the pieces of the file requested; and when a responseText property of the XHR object is sufficiently large to be able to fulfill one of the requested pieces, it can be split and converted to a typed array (e.g., as an UInt8Array object).

In accordance with an embodiment, even if only a small chunk of the file is requested, a request for a larger size (e.g., 512 Kb) can be created. This operates as a trade-off to address the assumption that a next chunk requested will probably be near a previously-requested chunk. In this way, the overall amount of HTTP requests to retrieve the file can be reduced, thus reducing the overall traffic (since every request needs its own HTTP headers, both for request and response).

Byte Processing

In accordance with an embodiment, once an MP3 file is downloaded, any additional or required modification to the raw data bytes can be performed, for example, by decrypting them. An MP3 file generally comprises three types of sections: an ID3v1 section, an ID3v2 section, and a music frames section. The ID3v2 section is located at the beginning, and its length can be dynamic, so the system can read it and skip it. The music frames are provided next; and then the ID3v1 section is located at the end. When the file is a constant bit rate (CBR) MP3 file, the length of a frame can be directly calculated using a formula that depends on the bit rate and the sample rate, for example:

$$frameLength=144*bitRate/sampleRate$$

In accordance with an embodiment, since the above formula does not return an integer most of the time, the frame length can be floored. In some instances, padding bytes can also be added, in order to be able to calculate precisely where a particular frame starts. The below formula enables the system to calculate directly where a particular frame is:

$$byteStart=10+id3v2Length+floor(144*bitRate*frameNumber)/sampleRate$$

In accordance with an embodiment, since a chunk is a group of one or more frames, its boundaries (e.g., byteStart and byteEnd) can be calculated by applying the same formula.

Chunk Decoding

In accordance with an embodiment, in order to be able to push audio to the sound card or other output mechanism of the media device, the system must decompress the MP3 file. To achieve this, the system can obtain a chunk or group of frames from the file, using the technique described above (e.g., by calculating byteStart and byteEnd), and pass this buffer (e.g., as a UInt8Array) to a decodeAudioData method of an audio context object (e.g., AudioContext) that manages a context for the media stream.

This particular method is typically used with complete MP3 files. However, in accordance with an embodiment, since a group of chunks is also a form of MP3 file (albeit a relatively shorter one), it can be similarly decoded using this method. The correct amount of bytes must be placed in the buffer; otherwise the method may fail (for example, due to having only half of a chunk in the buffer).

In accordance with an embodiment, a decodeAudioData method works asynchronously, so that the client user interface will not freeze while performing the decoding. Once the decoding has ended, a callback is called, and the raw audio data is obtained.

Outputting Audio to the Sound Card

In accordance with an embodiment, a returned raw audio data can be wrapped inside a buffer source object, for example using a createBufferSource method of the audio context object, and then assigning a buffer array (e.g., BufferArray). The buffer source object can then be sent to the sound card or other output mechanism of the media device, for example using a noteOn (deprecated) or start method, and giving the time of when to start, and when to stop playback.

In accordance with an embodiment, the time of when to start and when to stop can be calculated based on two factors:

1. An internal clock of the sound card (which is accessible from a currentTime property of the audio context object, and which is more precise than a timer built with setTimeout, a Date object, or similar approaches).

2. The duration of a chunk, which can be calculated by dividing the amount of bytes by the byte rate (e.g., in kbps), and which in accordance with an embodiment is generally a constant of around 26 ms duration.

In accordance with an embodiment, buffer starts and ends must be explicitly indicated, since otherwise artifacts will be created. An MP3 decoder can address this by adding ramps of frames or media content at the beginning and end of a decoded MP3 content, which must then be disposed of, or otherwise dropped, since the information being decoded through decodeAudioData is, as described above, not an entire MP3 file, but instead a smaller piece of that MP3 file.

Figure 5:
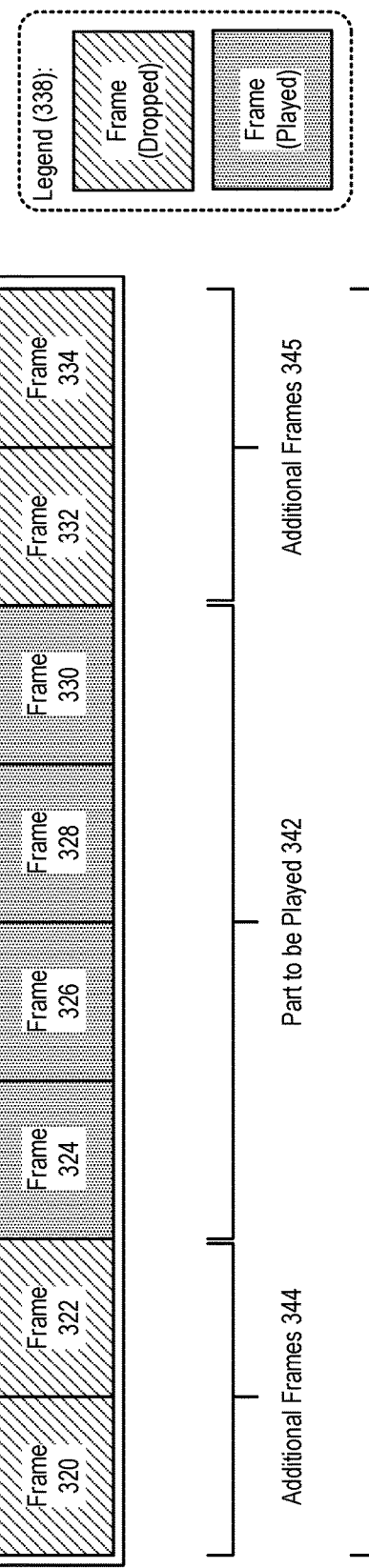
FIG. 5 illustrates a means of processing data, for use in streaming music on mobile devices, in accordance with an embodiment.

FIG. 5 illustrates a means of processing data, for use in streaming music on mobile devices, in accordance with an embodiment.

As shown in FIG. 5, in accordance with an embodiment, a stream of media content 310 associated with a media content (e.g., MP3) file, can include a plurality of frames 320-334, some of which will be played while others will be dropped (as indicated in this example by legend 338). One approach of accomplishing this within a particular chunk to be decoded 340, is to ramp or use one or more additional frames 344, 345, before and after that part of the media content file that is to be played 342, and to then later discard, drop or otherwise avoid playing those additional frames, by setting appropriate start and stop points.

Figure 6:
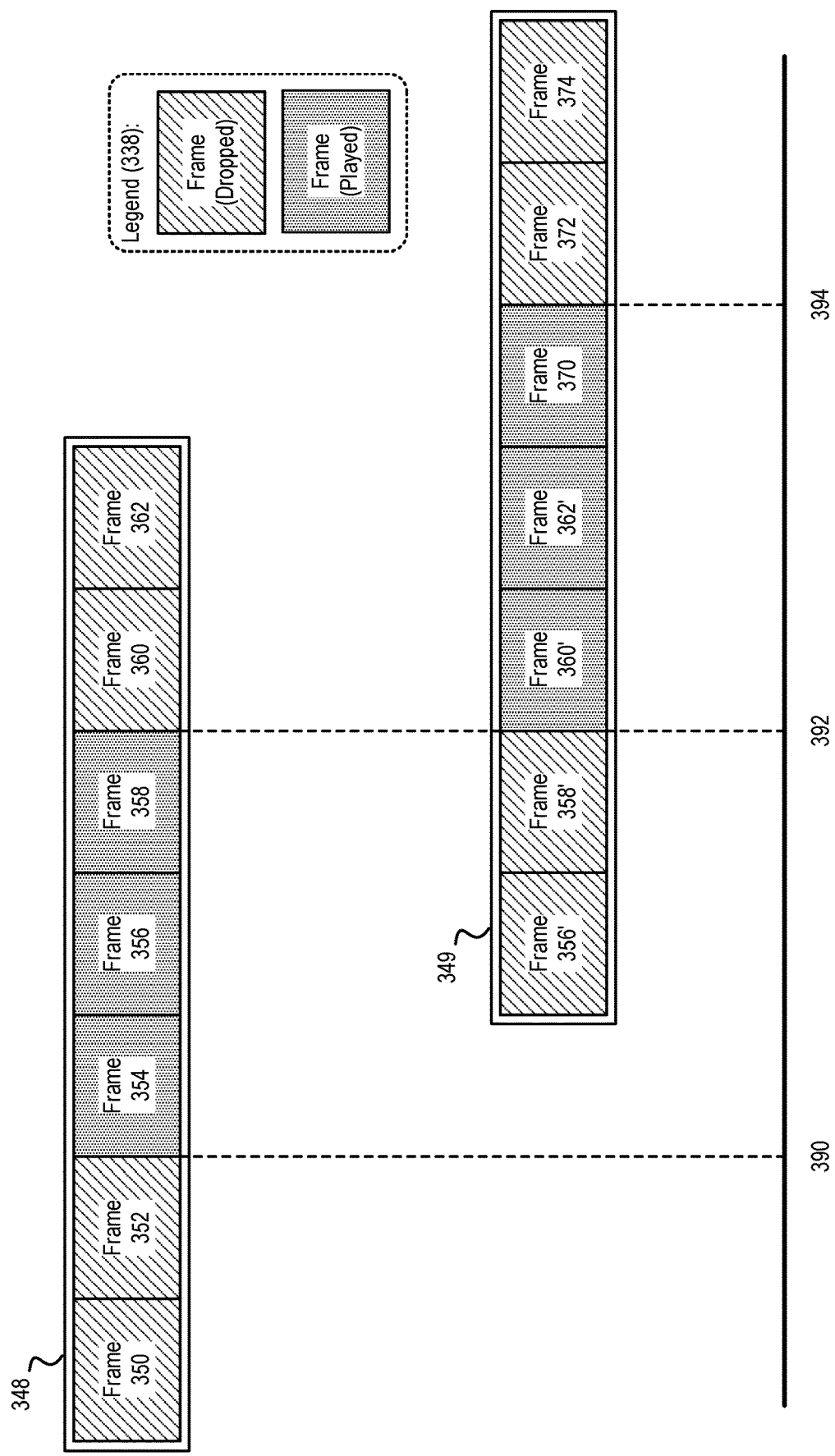
FIG. 6 further illustrates a means of processing data, for use in streaming music on mobile devices, in accordance with an embodiment.

FIG. 6 further illustrates a means of processing data, for use in streaming music on mobile devices, in accordance with an embodiment.

In particular, FIG. 6 illustrates the above approach when using two sets of frames (here indicated as a first set 348 of frames 350-362, and a second set 349 of frames 356-374), and whose start and stop points are set at 390, 392, and 394 as shown. The ramps added by the decodeAudioData typically only affect the first approximately 50 ms of the decoded audio (i.e., approximately 2-3 frames both at the beginning and the end). In accordance with an embodiment, these ramped frames are decompressed from the MP3 source files, but are then dropped and are not played at the media device.

As also illustrated in FIG. 6, in some instances, a second set of frames can reuse some of the previously fetched or first set of frames, which if buffered in any of the internal buffers described above, means that those frames need not be re-fetched in order to play the second set of frames. For example, as illustrated in the example of FIG. 6, frames 360-362 have been previously fetched, and if buffered can be reused without re-fetching.

Seeking

In accordance with an embodiment, seeking can be performed using a two-step process:

1. Flush the buffer associated with the sound card or other output mechanism, including getting all of the previously-pushed buffers that have not been played yet, and disconnecting them from the audio context object.

2. Calculate the frame to start playing again, based on the length of the file and its duration, using the formula:

frameStart=floor((fileLength−id3v2Length)*seekPosition/frameLength)

The fileLength can be obtained by an initial XHR HEAD request, and then reading the Content-Length header. The frameLength can be obtained using the formula described above. The seekPosition represents the position to jump within a song or piece of music, for example within a [0, 1] range.

For example, given a requested percentage of how much of a song to play, the system can translate the requested song position to a frame number, together with additional frames or ramps as appropriate, and retrieve the corresponding frames using the above technique.

Volume Control

In accordance with an embodiment, volume control can be implemented using a gain node. Instead of connecting buffer source objects directly to the audio context destination, they can be connected to the gain node, which can be connected to the audio context and associated with a "gain" value changeable from 0 to 1 to reflect the percent of volume selected or required.

Process of Streaming Media Content

Figure 7:
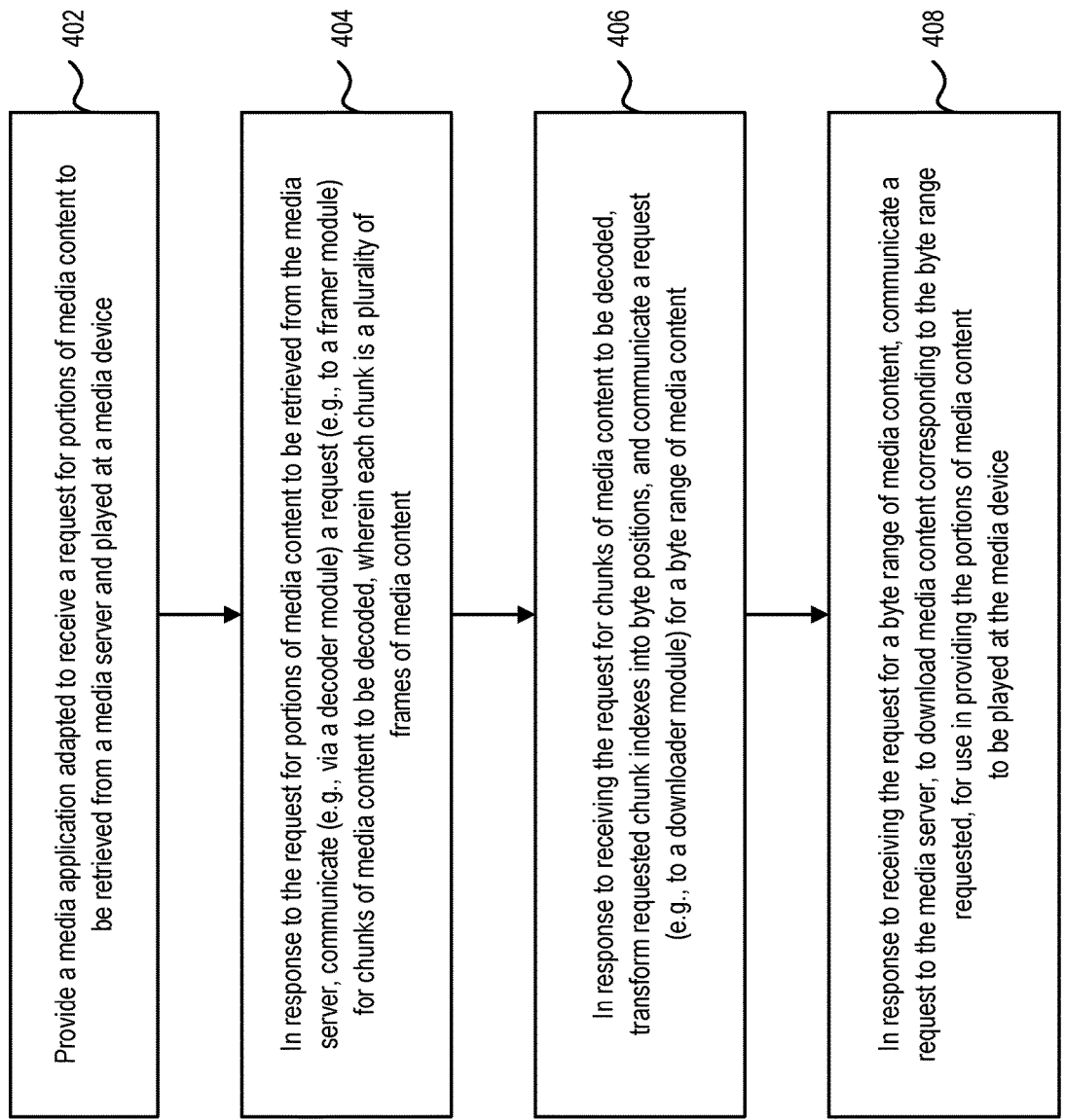
FIG. 7 illustrates a method for providing media content, in accordance with an embodiment.

FIG. 7 illustrates a method for providing media content, in accordance with an embodiment.

As illustrated in FIG. 7, in accordance with an embodiment, at step 402, a media application is provided that is adapted to receive a request for portions of media content to be retrieved from a media server and played at a media device.

At step 404, in response to the request for portions of media content to be retrieved from the media server, a request is communicated (e.g., via a decoder module, to a framer module) for chunks of media content to be decoded, wherein each chunk is a plurality of frames of media content.

At step 406, in response to receiving the request for chunks of media content to be decoded, requested chunk indexes are transformed into byte positions, and a request is communicated (e.g., to a downloader module) for a byte range of media content.

At step 408, in response to receiving the request for a byte range of media content, a request is communicated to the media server, to download media content corresponding to the byte range requested, for use in providing the portions of media content to be played at the media device.

As described previously, the above approach provides flexibility in providing access to a media streaming service from non-native mobile device applications, for example by enabling a media application to load and play encrypted MP3 file content in environments such as mobile browsers that require low memory consumption, or do not support Media Source Extensions.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while several of the examples described above generally illustrate use with MP3 files, and streaming of song or music content; embodiments of the systems and methods described herein can be used with other types of media content data file, and/or with other types of media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for streaming music, comprising:
a media device including a microprocessor, and a media application executing thereon that is adapted to receive requests for portions of media content to be retrieved from a media server, to be played at the media device, wherein the media server stores items of media content as media content files;
wherein the media application is configured to, with the media device, in response to receiving the a request for a particular portion of media content to be retrieved from the media server, said particular portion of media content associated with a seek position and a selected part of a media content file stored at the media server;
determine, based on the seek position, a corresponding number of frames of media content to be decoded;
determine if an associated frame data has been previously fetched from the media server and is available in a first buffer at the media device;
determine a corresponding byte range of media content stored within the media content file at the media server;
determine if any of an associated byte data has been previously downloaded and is available in a second buffer at the media device;
communicate a HTTP request including a range header to the media server, to download the media content associated with the corresponding byte range for the associated byte data that has not been previously downloaded;
and wherein for the particular portion of media content, the corresponding frames of media content includes a plurality of additional frames before and after the particular portion of media content to be decoded, and wherein the plurality of additional frames are dropped. during playing of the media content by:
determining a frame length; and
setting a start point and a stop point associated with a set of frames that are to be played, based on the determination of frame length, and the seek position from which playback of the particular portion of media content is to begin.

2. The system of claim 1, wherein each piece of media content is stored or provided as an MP3 file.

3. A method for streaming music, comprising the steps of:
receiving, at a media device, requests for portions of media content to be retrieved from a media server, to be played at the media device, wherein the media server stores items of media content as media content files;
in response to receiving a request for a particular portion of media content to be retrieved from the media server, said particular portion of media content associated with a seek position and a selected part of a media content file stored at the media server;
determining, based on the seek position, a corresponding number of frames of media content to be decoded;
determining if an associated frame data has been previously fetched from the media server and is available in a first buffer at the media device;
determining a corresponding byte range of media content stored within the media content file at the media server;
determining if any of an associated byte data has been previously downloaded and is available in a second buffer at the media device;
communicating a HTTP request including a range header to the media server, to download the media content associated with the corresponding byte range for the associated byte data that has not been previously downloaded;
and wherein for the particular portion of media content, the corresponding frames of media content incudes a plurality of additional frames before and after the particular portion of media content to be decoded, and wherein the plurality of additional frames are dropped during playing of the media content by:
determining a frame length; and
setting a start point and a stop point associated with a set of frames that are to be played, based on the determination of frame length, and the seek position from which playback of the particular portion of media content is to begin.

4. The method of claim 3, wherein each piece of media content is stored or provided as an MP3 tile.

5. A non-transitory computer readable storage medium, including instructions stored thereon which when read and executed by one or more computer devices cause the one or more computer devices to perform the steps comprising:
receiving, at a media device, requests for portions of media content to be retrieved from a media server, to be played at the media device, wherein the media server stores items of media content as media content files:

in response to receiving a request for a particular portion of media content to be retrieved from the media server, said particular portion of media content associated with a seek position and a selected part of a media content file stored at the media server:

determining, based on the seek position, a corresponding number of frames of media content to be decoded;

determining if an associated frame data has been previously fetched from the media server and is available in a first buffer at the media device;

determining a corresponding byte range of media content stored within the media content file at the media server:

determining if any of an associated byte data has been previously downloaded and is available in a second buffer at the media device:

communicating a HTTP request including a range header to the media server, to download the media content associated with the corresponding byte range for the associated byte data that has not been previously downloaded;

and wherein for the particular portion of media content, the corresponding frames of media content includes a plurality of additional frames before and after the particular portion of media content to be decoded, and wherein the plurality of additional frames are dropped during playing of the media content by:

determining a frame length; and setting a start point and a stop point associated with a set of frames that are to be played, based on the determination of frame length, and the seek position from which playback of the particular portion of media content is to begin.

6. The non-transitory computer readable storage medium of claim 5, wherein each piece of media content is stored or provided as an MP3 file.

7. The system of claim 1, whereupon an initial play of a media content file, a group of chunks are provided to an output at the media device for playing, with different starting times, and as each particular chunk finishes playing, a new chunk is provided to the output.

8. The system of claim 7, wherein returned audio data is wrapped inside a buffer source object, and provided to the output at the media device for playing, together with a time of when to start, and when to stop playback.

9. The method of claim 3, whereupon an initial play of a media content file, a group of chunks are provided to an output at the media device for playing, with different starting times, and as each particular chunk finishes playing, a new chunk is provided to the output.

10. The method of claim 9, wherein returned audio data is wrapped inside a buffer source object, and provided to the output at the media device for playing, together with a time of when to start, and when to stop playback.

11. The non-transitory computer readable storage medium of claim 5, whereupon an initial play of a media content file, a group of chunks are provided to an output at the media device for playing, with different starting times, and as each particular chunk finishes playing, a new chunk is provided to the output.

12. The non-transitory computer readable storage medium of claim 11, wherein returned audio data is wrapped inside a buffer source object, and provided to the output at the media device for playing, together with a time of when to start, and when to stop playback.

13. The system of claim 1, wherein playback of the portions of media content comprises playing of frames from a plurality of chunks, and wherein start and stop points are determined for each chunk.

14. The method of claim 3, wherein playback of the portions of media content comprises playing of frames from a plurality of chunks, and wherein start and stop points are determined for each chunk.

15. The non-transitory computer readable storage medium of claim 5, wherein playback of the portions of media content comprises playing of frames from a plurality of chunks, and wherein start and stop points are determined for each chunk.

16. The system of claim 1, wherein the portions of media content identified by the start and stop points associated with the set of frames to he played are provided to an output at the media device for playback by the media device.

17. The method of claim 3, further comprising providing the portions of media content identified by the start and stop points associated with the set of frames to be played, to an output to be played at the media device.

18. The non-transitory computer readable storage medium of claim 5, wherein the one or more computer devices are further caused to provide the portions of media content identified by the start and stop points associated with the set of frames to be played, to an output to be played at the media device.

* * * * *